UNITED STATES PATENT OFFICE.

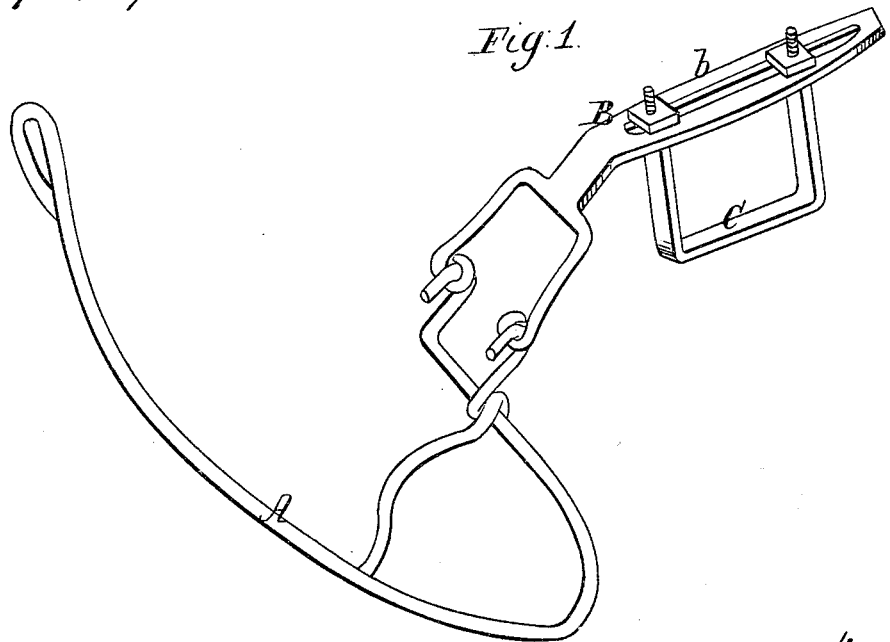

LOYAL M. DODDRIDGE, OF NEW MOUNT PLEASANT, INDIANA.

IMPROVEMENT IN WEED-GATHERERS FOR PLOWS.

Specification forming part of Letters Patent No. 94,578, dated September 7, 1869.

*To all whom it may concern:*

Be it known that I, L. M. DODDRIDGE, of New Mount Pleasant, in the county of Jay, in the State of Indiana, have invented a new and useful Improvement in Weed-Gatherers; and I do hereby declare that the following is a full and exact description thereof, reference being had to the accompanying drawings and the letters of reference marked thereon.

The figure represents a perspective view of the device.

My invention consists in providing a device for turning down and burying weeds, &c., to be attached to a plow in breaking up ground.

To enable others skilled in the art to make and use my invention, I will proceed to describe its construction and operation.

A is the frame, made of wrought-iron, by preference, and constructed substantially as shown in the drawing, its short arm and cross-piece being bent so as to form hooks, by which it is to be attached to the forked end of the sliding bar B. This bar is provided with a longitudinal slot, $b$, through which the ends of a stirrup-clevis, C, pass, by which it is secured to the beam of a plow. By means of the slot the device may be adjusted laterally. The end of the sliding bar extending from the plow is bent down and then forked, the two prongs or arms forming at their ends eyes for the reception of the hooks of the frame.

For the sake of economy, the clevis and sliding bar may be dispensed with, and two staples driven into the beam of the plow at the right point, to which the frame may be attached.

The position of the device with reference to the mold-board of a plow is to be such that the long arm of the frame extends forward in line with the plow, sliding along over the ground in the preceding furrow, its rear curved end extending back to the rear end of the mold-board. So arranged, it will bear down weeds, stalks, &c., and hold them down until they are buried in the preceding furrow. The frame A, being hinged, is capable of overcoming any immovable obstructions.

Having thus described my invention, what I claim, and desire to secure by Letters Patent, is—

In combination with a plow, a device for turning down and burying weeds, &c., consisting of the hinged frame A, sliding bar B, and clevis C, substantially as shown and described.

In testimony whereof I have signed my name to this specification in the presence of two subscribing witnesses.

LOYAL M. DODDRIDGE.

Witnesses:
HENRY REITENOUR,
CALDWELL C. CARTWRIGHT.